United States Patent
Haanappel et al.

(10) Patent No.: US 12,290,854 B2
(45) Date of Patent: May 6, 2025

(54) COMPOSITION, CORE AND MOULD FOR CASTING AND MOULDING PROCESSES

(71) Applicant: FOSECO INTERNATIONAL LIMITED, Barlborough Links (GB)

(72) Inventors: Vincent Haanappel, Enschede (NL); Thomas Linke, Enschede (NL)

(73) Assignee: FOSECO INTERNATIONAL LIMITED, Barlborough Links (GB)

( * ) Notice: Subject to any disclaimer, the term of this patent is extended or adjusted under 35 U.S.C. 154(b) by 0 days.

(21) Appl. No.: 18/249,964

(22) PCT Filed: Oct. 25, 2021

(86) PCT No.: PCT/EP2021/079512
§ 371 (c)(1),
(2) Date: Apr. 20, 2023

(87) PCT Pub. No.: WO2022/084555
PCT Pub. Date: Apr. 28, 2022

(65) Prior Publication Data
US 2023/0398599 A1 Dec. 14, 2023

(30) Foreign Application Priority Data
Oct. 23, 2020 (WO) ................. PCT/EP2020/079890

(51) Int. Cl.
*B22C 9/10* (2006.01)
*B22C 1/02* (2006.01)
(Continued)

(52) U.S. Cl.
CPC .................. *B22C 1/22* (2013.01); *B22C 1/02* (2013.01); *B22C 9/10* (2013.01); *B22C 9/12* (2013.01);
(Continued)

(58) Field of Classification Search
CPC .. B22C 1/02; B22C 1/08; B22C 1/167; B22C 1/185; B22C 1/22; B22C 1/222;
(Continued)

(56) References Cited

U.S. PATENT DOCUMENTS

| 5,573,055 A | 11/1996 | Melling et al. |
| 2018/0345356 A1* | 12/2018 | Lehmann ............... B22C 1/2273 |
| 2019/0118244 A1* | 4/2019 | Lehmann ............. C04B 35/6303 |

FOREIGN PATENT DOCUMENTS

| DE | 102017107657 A1 * | 7/2018 | ............. B22C 1/188 |
| EA | 038564 B1 | 9/2021 | |

(Continued)

OTHER PUBLICATIONS

International Search Report and Written Opinion received for PCT Serial No. PCT/EP2021/079512 on Dec. 23, 2021, 11 pgs.

*Primary Examiner* — Kevin E Yoon
(74) *Attorney, Agent, or Firm* — Merchant & Gould P.C.

(57) ABSTRACT

A composition for making a core for use in a moulding or casting process, a core comprising said composition, and a mould for producing an article by high pressure die casting or semi-solid casting. The composition comprises a particulate refractory material, a binder composition comprising at least one hydrophilic polymer, comprising at least one polysaccharide or polysaccharide derivative; and at least one pozzolanic additive. The mould comprises a core for defining an internal cavity of the article and the core comprises a solidified core composition. The solidified core composition comprises a particulate refractory material and a binder composition, degrades in water such that a cylinder of the solidified core composition having a maximum height of 80 mm and a maximum diameter of 50 mm disintegrates in no more than 10 minutes when immersed in water at a temperature of 20° C. and stirred at a speed of 60 rpm, and has a flexural strength of at least 300 N/cm². The invention also
(Continued)

resides in a method for producing an article by high pressure die casting or semi-solid casting.

16 Claims, 2 Drawing Sheets

(51) Int. Cl.
- *B22C 1/22* (2006.01)
- *B22C 9/02* (2006.01)
- *B22C 9/12* (2006.01)
- *B22D 17/00* (2006.01)
- *B22D 29/00* (2006.01)
- *B33Y 10/00* (2015.01)

(52) U.S. Cl.
CPC .......... *B22D 17/007* (2013.01); *B22D 29/002* (2013.01); *B33Y 10/00* (2014.12)

(58) Field of Classification Search
CPC ........... B22C 1/2293; B22C 1/26; B22C 9/02; B22C 9/10
See application file for complete search history.

(56) References Cited

FOREIGN PATENT DOCUMENTS

| | | | | |
|---|---|---|---|---|
| EP | 0281532 A1 | * | 9/1988 | .............. B22C 1/02 |
| EP | 1113890 A1 | | 7/2001 | |
| EP | 2359957 A1 | | 8/2011 | |
| EP | 2476495 A1 | | 7/2012 | |
| EP | 2564951 A1 | | 3/2013 | |
| EP | 2921243 A1 | | 9/2015 | |
| RU | 2033880 C1 | | 4/1995 | |
| RU | 2450886 C1 | | 5/2012 | |
| RU | 2671520 C1 | | 11/2018 | |
| SU | 1411089 A1 | | 7/1988 | |
| WO | 95/15230 A | | 6/1995 | |
| WO | 9515230 A1 | | 6/1995 | |
| WO | WO-2004110719 A2 | * | 12/2004 | .......... B29C 64/165 |
| WO | 2020/146452 A1 | | 1/2020 | |

* cited by examiner

COMPOSITION, CORE AND MOULD FOR CASTING AND MOULDING PROCESSES

CROSS-REFERENCE TO RELATED APPLICATIONS

This application is a National Stage Application of PCT/EP2021/079512, filed Oct. 25, 2021, which claims benefit of Serial No. PCT/EP2020/079890, filed Oct. 23, 2020, with the European Receiving Office, and which applications are incorporated herein by reference. To the extent appropriate, a claim of priority is made to each of the above disclosed applications.

TECHNICAL FIELD

The present invention relates to a composition for use as a core in a casting or moulding process, a core comprising the composition, casting moulds comprising a core, and a method for producing an article using a core. In particular, the present invention relates to a core which can be washed out of the internal cavity of a cast or moulded article using water.

BACKGROUND

In a typical casting process, molten metal (or metal alloy) is poured into a pre-formed mould cavity which defines the shape of the casting, with the molten metal filling the mould cavity under the force of gravity. The shape of hollow sections or internal cavities in the casting may be defined by a disposable core, which is typically made from hardened, resin-bonded sand. During casting, the extreme heat from the molten metal thermally decomposes the resin binder in the core, allowing the core to break down and be easily shaken out of the finished casting when the molten metal has cooled and solidified. However, in die casting processes where the metal is cooled very quickly or the walls of the casting are relatively thin, the core may not be exposed to enough heat during the casting process for the binder to decompose, making the core very difficult to remove after the casting has solidified. Examples of such die casting processes include high pressure die casting, low pressure die casting, high vacuum die casting, semi-solid casting (such as rheocasting and thixocasting), permanent or semi-permanent mould casting, and squeeze casting. In such processes, the core may typically only be exposed to temperatures as high as 300° C., and for a limited amount of time, which is not sufficient to thermally decompose conventional resin binders.

In high pressure die casting (HPDC), molten metal is injected into the mould cavity at high pressure (typically around 10-175 MPa) and held in place by a compressive force until the metal solidifies. HPDC is extremely fast compared to flow pouring under gravity, since the injection pressure causes the molten metal to fill the mould cavity in seconds (or even milliseconds) and the casting may be actively cooled, for example by internal water pipes within the die. HPDC is especially useful for casting articles with thin walls, where the high pressure forces the liquid metal into narrow spaces that cannot be reached by gravity pouring. This technique can therefore be used to reduce the weight of metal articles by enabling articles to be cast with thinner walls and hollow interiors.

Semi-solid casting involves a similar process, wherein the metal (or metal alloy) is injected into the die in a semi-solid state rather than a fully molten state. In this semi-solid state, the metal obtains a globular microstructure which improves kinematic viscosity and metal flowability, and thus improves the quality of the final casting. In rheocasting, the metal is cooled from a fully molten state to a semi-solid state before injection, whereas in thixocasting solid metal is partially melted to a semi-solid state. Semi-solid casting is typically used for high-end applications requiring a high quality finish.

Moulds for conventional gravity pouring casting processes are typically made from sand and may be disposable. Moulds for die casting, on the other hand, are usually made from metal (such as steel), and may need to withstand high pressures and metal velocities. Moulds for die casting may also include injection, water cooling and/or vacuum systems. Due to the increased complexity of die casting mould systems compared with conventional sand mould systems, a die casting mould is often a permanent or semi-permanent mould, with disposable cores being used to create internal shapes in the casting.

As well as being difficult or impossible to remove after use, conventional sand cores may not have sufficient strength to withstand the pressures and metal velocities involved in some die casting processes, such as HPDC or semi-solid casting, and may shatter during such use. Conventional resin-bonded sand cores are therefore unsuitable for use in such die casting processes.

In an attempt to mitigate these issues, some cores for use in die casting have been made from salt, which can then be removed from the finished casting by dissolving in hot water. However, the salt can only be moulded into the desired shape of the core while in molten form, and usually under high pressure, so producing salt cores is complex and expensive.

Other low temperature processes for producing moulded articles, such as carbon composite moulding, may also suffer from similar issues in removing the core. Carbon composite articles are typically cured in an autoclave at temperatures up to 200° C., which is not sufficient to decompose the binder in a typical resin-bonded sand core, making it very difficult to remove the core from an internal cavity after the carbon composite article has set.

EP 2564951 A1 describes a moulding or core sand which is bonded by a biodegradable polymeric binder. However, the moulding/core sand disclosed in this document is formulated for use in high temperature casting applications and requires that the binder undergoes high temperature or microwave-induced cross-linking for hardening. The binder therefore relies on thermal degradation of the binder to allow the core to be shaken out of the finished casting, and on cross-linking of the polymer for strength. As such, the cores disclosed in EP 2564951 A1 do not have the required strength for applications where the core may not experience high enough temperatures to cross-link the polymeric binder in use, such as die casting.

WO 2020/146452 A1 describes a method of producing a washout tool for carbon composite moulding, which requires 3D-printing a mixture of powdered silica sand and an amine-containing adhesive polymer. The binder is only water soluble up to 180° C. and hence is only suitable for very low temperature applications such as carbon composite moulding, not for other applications such as die-casting where the core may be exposed to temperatures as high as 300° C.

The present invention seeks to overcome the abovementioned problems associated with removing an internal core from a cast or moulded article, or at least to provide a useful alternative.

SUMMARY OF THE INVENTION

Composition

According to a first aspect of the invention, there is provided a composition for making a core for use in a moulding or casting process. The composition comprises a particulate refractory material, a binder composition comprising at least one hydrophilic polymer wherein the at least one hydrophilic polymer comprises at least one polysaccharide or polysaccharide derivative, and at least one pozzolanic additive.

The inventors of the present invention have found that cores made from the composition of the first aspect have sufficient strength to withstand the forces experienced during casting or moulding processes while also being capable of being washed out of an internal cavity of a cast or moulded article using only water. It will be understood that only some components of the composition will be soluble in water per se, while other components (such as the particulate refractory material) will not be soluble in water. However, a core made from the composition of the first aspect may disintegrate in water due to degradation of the components binding the particulate refractory material (and any other insoluble components) together, as the binding components dissolve or hydrate, and thus the core may be referred to as "water soluble" for the purposes of this disclosure. Accordingly, the terms "water soluble" and "water solubility" are used herein to describe the ability of a core comprising the composition of the first aspect to disintegrate in water, rather than the ability of the composition to form a solution in water.

In some embodiments, a core made using the composition is water soluble even after being heated to at least 200° C. In some embodiments, a core made using the composition is water soluble after being heated to a temperature from 200 to 350° C.

In some embodiments, the composition is for making a core for use in a die casting process and/or a carbon composite moulding process.

The composition of the first aspect will typically be a granular solid, which may be substantially dry or partially wet depending on the liquid content and relative proportion of binder composition to particulate refractory material used in the composition. Preferably, the composition is a flowable granular solid. In use, the composition is formed into a core in the shape of an internal cavity of an article to be cast or moulded. The core is typically formed in the desired shape by compacting the core composition in a mould and then hardening the composition, for example by drying. This may be achieved using a core-shooting apparatus. Alternatively, the core may be produced by an additive manufacturing process (3D printing). Without wishing to be bound by theory, it is thought that the binder composition may bind the particulate refractory material in the core via a physical interaction with the particulate refractory material (e.g. by interlocking or by holding the particulate refractory material within a matrix) as well as or instead of via chemical adhesion.

According to a second aspect of the invention, there is provided a core comprising the composition of the first aspect. The core may be used in a moulding or metal casting process to define an internal cavity of the moulded or cast article. In some embodiments, the core is for use with a casting mould, e.g. a die casting mould. In some embodiments, the core is for use in the production of a carbon composite article.

In some embodiments, the core comprises a surface coating. The surface coating may fulfil a number of different functions. For example, the surface may provide: a protective layer to prevent detrimental interaction between molten metal and the core composition; a sealant to prevent ingress of metal between the grains of particulate refractory material in the core, particularly at higher pressures; a smoothing effect on the surface of the core, which in turn may improve the finished surface of the casting; or non-stick properties to allow easy detachment of the core from the casting after solidification. The surface coating may be selected based on the material which is to be cast or moulded, e.g. to be non-wetting for the material which is to be cast or moulded, and based on the function(s) to be provided by the coating. Any surface coating that is suitable for refractory applications may be used, for example coatings comprising boron nitride, silicates, titania, zirconia or alumina. Surface coatings for refractory applications typically comprise a binder which adheres the coating to a surface. In some embodiments of the present invention, the binder of the surface coating is water-soluble so that the coating can be washed out with the rest of the core rather than sticking to the surface of the article.

According to a third aspect of the invention, there is provided a mould comprising the core of the second aspect. In some embodiments, the mould is for producing an article by casting and the core is for defining an internal cavity of the article. In some embodiments, the mould is for die casting. In some embodiments, the mould is made from metal, such as steel. In some embodiments, the mould is for high pressure die casting or semi-solid casting.

Binder Composition

The term "binder composition" as used herein will be understood to mean a composition comprising compounds which bind together the particulate refractory material. Preferably, the binder composition is an organic binder composition comprising organic binder compounds. The binder composition may further comprise non-binder components, such as surfactants. The binder composition may also comprise at least one solvent.

The binder composition comprises at least one hydrophilic polymer. In some embodiments, the binder composition further comprises at least one surfactant.

In some embodiments, when mixing the binder composition with the particulate refractory material to formulate the composition of the first aspect, the binder composition is provided as a pre-formed mixture. In alternative embodiments, when mixing the binder composition with the particulate refractory material to formulate the composition of the first aspect, the binder composition is provided in the form of individual components which combine together to provide the binder composition when mixed with the particulate refractory material. It will be understood that the resulting composition will comprise all of the components of the binder composition, regardless of whether they are mixed with the particulate refractory material together or individually.

In some embodiments, the composition comprises at least 0.5, at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, or at least 20 wt % binder composition based on the weight of particulate refractory material. In some embodiments, the composition comprises no more than 50, no more than 40, no more than 30, no more than 20, no more than 15, no more than 10, no more than 5, no more than 2, or no more than 1 wt % binder composition based on the weight of particulate refractory material. In some embodiments, the binder composition comprises from 0.5 to 30, from 1 to 20, from 2 to or from 2 to 10 wt % binder composition based on the weight of particulate refractory material.

The inventors of the present invention have found that the viscosity of the binder composition may affect the flowability of the composition, which in turn may affect the ease of manufacture and the performance of a core made from the composition. Without wishing to be bound by theory, it is thought that higher flowability of the composition allows the composition to be discharged more easily from the core-shooting apparatus, thereby preventing blockages in the apparatus, and to flow into all parts of the core mould cavity such that even a complex core mould cavity can be completely filled without any gaps or voids, thereby improving the strength of the core and reducing waste due to defective cores. Moreover, higher flowability is thought to allow better close-packing and compaction of the composition, which may also contribute to improved strength in the core.

In general, lower viscosity of the binder composition has been found to result in higher flowability of the composition and vice versa. A lower viscosity may also help to ensure uniform distribution of the binder composition when mixed with the particulate refractory material, which in turn may improve particle-to-particle binding, thereby increasing the strength of the core. However, it will be understood that the overall viscosity/flowability of the composition must be balanced with other factors which affect the strength of the resulting core, since a binder composition which is highly diluted in order to achieve a low viscosity may provide a highly flowable composition, but might not achieve adequate binding of the particulate refractory material, which would be detrimental to the strength of the core.

In some embodiments, the binder composition has a dynamic viscosity at 23° C. of no more than 1 Pa·s, no more than 500 mPa·s, no more than 400 mPa·s, no more than 300 mPa·s or no more than 200 mPa·s. In some embodiments, the binder composition has a dynamic viscosity at 23° C. of at least 5 mPa·s, at least 10 mPa·s, at least 20 mPa·s, at least 50 mPa·s, at least 100 mPa·s or at least 200 mPa·s. In some embodiments, the binder composition has a dynamic viscosity at 23° C. of from 5 mPa·s to 1 Pa·s, from 10 mPa·s to 500 mPa·s or from 20 mPa·s to 400 mPa·s.

It will be understood that the viscosity of the binder composition is the viscosity as measured before the binder composition is mixed with the particulate refractory material to formulate the composition, i.e. the viscosity of the binder composition in isolation. Furthermore, it will be understood that in embodiments where the pozzolanic additive, when present, is mixed with the binder composition before the binder composition is mixed with the particulate refractory material to formulate the composition, the viscosity of the binder composition is the viscosity of the binder composition alone, not the viscosity of the binder composition/pozzolanic additive mixture. It will also be understood that, in embodiments where the binder composition is mixed with the particulate refractory material in the form of individual components rather than as a pre-formed mixture, the viscosity of the binder composition is deemed to be the overall viscosity that the binder composition would have if the individual components of the binder composition were mixed together to provide a pre-formed mixture prior to formulation.

It will be understood that the viscosity of the binder composition as a whole may be affected by the viscosity of the individual components included therein, e.g. the viscosity of the at least one hydrophilic polymer, as well as the dilution level of the binder composition. The viscosity of the binder composition may also potentially be affected by viscosity-modifying interactions between the individual components.

In some embodiments, the binder composition comprises at least one solvent, such as water. The solvent may be used to dissolve or hydrate components of the binder composition which are supplied in solid form, to ensure adequate dispersion of the binding components within the particulate refractory material, and/or to dilute the binder composition to achieve a desired viscosity. It will be understood that, in some embodiments, components of the binder composition are supplied in solution, for example in aqueous solution, and so at least some of the solvent in the binder composition is provided by the component(s) that are supplied in solution. In some such embodiments, no additional solvent will need to be added to the binder composition in order to achieve adequate dispersion and/or a desired viscosity. However, in some embodiments, additional solvent will need to be added to the binder composition to supplement the amount of solvent provided by the component(s) that are supplied in solution and increase the total amount of solvent in the binder composition.

In some embodiments, the binder composition comprises at least 10, at least 20, at least 30, at least 40, at least 50, at least 60, or at least 70 wt % solvent based on the total weight of binder composition. In some embodiments, the binder composition comprises no more than 80, no more than 70, no more than 60, no more than 50, no more than 40, no more than 30, or no more than 20 wt % solvent based on the total weight of binder composition. In some embodiments, the binder composition comprises from 10 to 80, from 20 to 70, from 30 to 70, or from 40 to 70 wt % solvent based on the total weight of binder composition.

Hydrophilic Polymers

Hydrophilic polymers can be considered generally as polymers which have favourable interactions with water molecules, as opposed to hydrophobic polymers which repel water. Hydrophilic polymers may be soluble in water or may absorb/adsorb water, for example to swell or form a gel. Hydrophilic polymers typically comprise charged or polar functional groups which attract water molecules.

In the present invention, the binder composition comprises at least one hydrophilic polymer. The at least one hydrophilic polymer comprises at least one polysaccharide or polysaccharide derivative. In some embodiments, the at least one hydrophilic polymer may further comprise at least one synthetic polymer, at least one further polysaccharide or polysaccharide derivative, or mixtures thereof.

In some embodiments, the at least one hydrophilic polymer is in solution, for example an aqueous solution. In some embodiments, where the binder composition comprises more than one hydrophilic polymer, at least one of the hydrophilic polymers may be in solution. In some embodiments, where the binder composition comprises more than one hydrophilic polymer, all of the hydrophilic polymers may be in solution.

In some embodiments, the hydrophilic polymer solution has a solids content of no more than 80%, no more than 70%, no more than 60%, no more than 50%, no more than 40% or no more than 30% w/v. In some embodiments, the hydrophilic polymer solution has a solids content of at least 10%, at least 20%, at least 30%, at least 40%, at least 50%, at least 60% or at least 70% w/v. In some embodiments, the hydrophilic polymer solution has a solids content of from 10% to 80% or from 10% to 50% w/v. It will be understood that the solids content of the solution may be selected in order to achieve a desired viscosity of the binder composition, as previously mentioned.

In some embodiments, the binder composition comprises at least 10, at least 20, at least 30, at least 40, at least 50, at least 60, or at least 70 wt % hydrophilic polymer based on the total weight of binder composition. In some embodiments, the binder composition comprises no more than 80, no more than 70, no more than 60, no more than 50, no more than 40, no more than 30, or no more than 20 wt % hydrophilic polymer based on the total weight of binder composition. In some embodiments, the binder composition comprises from 10 to 80, from 20 to 70, from 20 to 60, or from 30 to 60 wt % hydrophilic polymer based on the total weight of binder composition.

In some embodiments, the hydrophilic polymer may comprise at least 0.5, at least 0.75, at least 1, at least 1.25, at least 1.5, at least 2, at least 2.5, at least 3, at least 4, or at least 5 wt % of the composition based on the weight of the refractory material.

In some embodiments, where at least one hydrophilic polymer is in solution, the binder composition comprises at least 50, at least 60, at least 70, at least 80, at least 90, at least 95, at least 99, or at least 99.5 wt % hydrophilic polymer solution based on the total weight of binder composition. In some embodiments, the binder composition comprises no more than 99.5, no more than 99, no more than 95, no more than 90, no more than 80, no more than 70, or no more than 60 wt % hydrophilic polymer solution based on the total weight of binder composition. In some embodiments, the binder composition comprises from 50 to 100, from 70 to 100, or from 80 to 99.5 wt % hydrophilic polymer solution based on the total weight of binder composition.

In some embodiments, the at least one hydrophilic polymer does not undergo cross-linking when the composition is heated at temperatures up to 250° C., up to 300° C. or up to 350° C. In some embodiments, the at least one hydrophilic polymer does not undergo cross-linking when the composition is heated to a temperature from 200 to 350° C.

Without wishing to be bound by theory, it is thought that temperature-induced cross-linking of the at least one hydrophilic polymer may reduce the water solubility of the core by changing the structural properties of the polymer, such that the polymer is prevented from dissolving or hydrating in water. Therefore, hydrophilic polymers which do not undergo cross-linking when the composition is heated at temperatures up to 350° C. may produce cores which have good water solubility even after being exposed to elevated temperatures during the casting or moulding process. However, hydrophilic polymers which undergo cross-linking at lower temperatures (for example between 200 and 300° C.) may still be suitable for lower temperature applications up to 200° C., such as carbon composite moulding or casting of metals or alloys with relatively low melting points. Moreover, in practice, only the outer edges or very thin sections of the core are likely to reach temperatures as high as 300° C. (or greater) during use. It will therefore be understood that suitable hydrophilic polymers may be selected based on the casting or moulding method the composition is for and on the shape and dimensions of the intended core.

Synthetic Polymers

Synthetic polymers are generally considered to be polymers which are human-made rather than naturally occurring. Synthetic polymers may be homopolymers comprising only one type of monomer, or copolymers comprising two or more different types of monomer.

In some embodiments, the at least one hydrophilic polymer comprises at least one synthetic polymer. In some embodiments, the at least one synthetic polymer is selected from the group consisting of polyacrylates, acrylate copolymers, polyvinyl alcohol, polyphosphates, polymetaphosphates, and mixtures thereof. In embodiments where the binder composition is an organic binder composition, the at least one synthetic polymer is selected from the group consisting of polyacrylates, acrylate copolymers, polyvinyl alcohol, and mixtures thereof.

The inventors of the present invention have found that polyacrylates and polyphosphates, in particular, produce cores which have excellent strength and water solubility. Moreover, the inventors found that polyacrylates and polyphosphates do not appear to undergo cross-linking at temperatures up to 300° C. and produce cores with excellent water solubility even after prolonged exposure to such temperatures, whereas polyvinyl alcohol, for example, may undergo cross-linking at temperatures above 200° C. and thus may be suitable for lower temperature applications.

In some embodiments, the at least one synthetic polymer comprises an alkali salt of polyacrylate, acrylate copolymer or polyphosphate. In some embodiments, the alkali salt is a sodium salt or potassium salt. Alkali salts, for example sodium polyacrylate or sodium polyphosphate, have been found to produce cores with particularly good water solubility, whereas ammonium salts, for example ammonium polyacrylate, have been found to produce cores which are less water soluble.

In some embodiments, the at least one synthetic polymer comprises a polyphosphate having a chain length of at least 4, at least 5, at least 6, at least 7, at least 10, at least 12, at least 15, at least 20, at least 25 or at least 30. In some embodiments, the at least one synthetic polymer comprises an alkali polyphosphate having a chain length of from 4 to 30.

The at least one synthetic polymer is preferably environmentally friendly, to facilitate safe disposal or recycling of the water used to flush out the core after use. In some embodiments, the at least one synthetic polymer comprises an alkali polyacrylate salt, which is non-hazardous.

In some embodiments, the at least one synthetic polymer has a molecular weight of no more than 1,000,000 g/mol, no more than 500,000 g/mol, no more than 100,000 g/mol, no more than 50,000 g/mol, no more than 10,000 g/mol or no more than 5,000 g/mol. In some embodiments, the at least one synthetic polymer is in solution, for example an aqueous solution. In some embodiments, the synthetic polymer solution has a solids content of no more than 80%, no more than 70%, no more than 60%, no more than 50%, no more than 40% or no more than 30% w/v. In some embodiments, the synthetic polymer solution has a solids content of at least 10%, at least 20%, at least 30%, at least 40%, at least 50%, at least 60% or at least 70% w/v. In some embodiments, the synthetic polymer solution has a solids content of from 10% to 80% or from 10% to 50% w/v.

In some embodiments, the at least one synthetic polymer or (where in solution) the synthetic polymer solution has a dynamic viscosity at 23° C. of no more than 1 Pa·s, no more than 500 mPa·s, no more than 400 mPa·s, no more than 300 mPa·s or no more than 200 mPa·s. In some embodiments, the at least one synthetic polymer or synthetic polymer solution has a dynamic viscosity at 23° C. of at least 5 mPa·s, at least 10 mPa·s, at least 20 mPa·s, at least 50 mPa·s, at least 100 mPa·s or at least 200 mPa·s. In some embodiments, the at least one synthetic polymer or synthetic polymer solution has a dynamic viscosity at 23° C. of from 5 mPa·s to 1 Pa·s, from 10 mPa·s to 500 mPa·s or from 20 mPa·s to 400 mPa·s. It will be understood that the molecular weight of the at least one synthetic polymer and/or the solids content of the solution (where the at least one synthetic polymer is in solution) may be selected in order to achieve a desired viscosity. It will also be understood that the viscosity of the at least one synthetic polymer or synthetic polymer solution is the viscosity as measured before the at least one synthetic polymer or synthetic polymer solution is mixed with the binder composition and/or particulate refractory material to formulate the composition, i.e. the viscosity of the at least one synthetic polymer or synthetic polymer solution in isolation.

In some embodiments, the at least one hydrophilic polymer comprises at least 10, at least 20, at least 30, at least 40, at least 50, at least 60, at least 70, at least 80, or at least 90 wt % synthetic polymer based on the total weight of hydrophilic polymer. In some embodiments, the at least one hydrophilic polymer comprises no more than 100, no more than 90, no more than 80, no more than 70, no more than 60, no more than 50, no more than 40, no more than 30, or no more than 20 wt % synthetic polymer based on the total weight of hydrophilic polymer. In some embodiments, the at least one hydrophilic polymer comprises from 10 to 100, from 20 to 90, from 30 to 80, or from 50 to 80 wt % synthetic polymer based on the total weight of hydrophilic polymer.

In some embodiments, the synthetic polymer may comprise at least 0.5, at least 0.75, at least 1, at least 1.25, at least 1.5, at least 2, at least 2.5, at least 3, at least 4, or at least 5 wt % of the composition based on the weight of the refractory material.

Polysaccharides and Polysaccharide Derivatives

Polysaccharides are polymeric carbohydrates comprising a chain of monosaccharide units. Examples of polysaccharides include starch, glycogen, cellulose and pectin, amongst others. Polysaccharide derivatives may generally be considered to be compounds which are derived from a polysaccharide by a chemical reaction, such as hydrolysis or addition of a functional group. Polysaccharide derivatives may also be known as modified polysaccharides, e.g. modified starch.

In the present invention, the at least one hydrophilic polymer comprises at least one polysaccharide or polysaccharide derivative (abbreviated hereafter to "at least one polysaccharide"). In some embodiments, the at least one polysaccharide is selected from the group consisting of starches, starch derivatives, cellulose, cellulose derivatives, and mixtures thereof. Polysaccharides or polysaccharide derivatives suitable for use with the present invention include dextrin, potato starch, carboxymethyl cellulose, and mixtures thereof.

In some embodiments, the at least one polysaccharide is in solution, for example an aqueous solution. In some embodiments, the polysaccharide solution has a solids content of no more than 80%, no more than 70%, no more than 60%, no more than 50%, no more than 40% or no more than 30% w/v. In some embodiments, the polysaccharide solution has a solids content of at least 10%, at least 20%, at least 30%, at least 40%, at least 50%, at least 60% or at least 70% w/v. In some embodiments, the polysaccharide solution has a solids content of from 10% to 80% or from 10% to 50% w/v.

In some embodiments, the at least one polysaccharide or (where in solution) the polysaccharide solution has a dynamic viscosity at 23° C. of no more than 1 Pa·s, no more than 500 mPa·s, no more than 400 mPa·s, no more than 300 mPa·s or no more than 200 mPa·s. In some embodiments, the at least one polysaccharide or polysaccharide solution has a dynamic viscosity at 23° C. of at least 5 mPa·s, at least 10 mPa·s, at least 20 mPa·s, at least 50 mPa·s, at least 100 mPa·s or at least 200 mPa·s. In some embodiments, the at least one polysaccharide or polysaccharide solution has a dynamic viscosity at 23° C. of from 5 mPa·s to 1 Pa·s, from 10 mPa·s to 500 mPa·s or from 20 mPa·s to 400 mPa·s. It will be understood that the solids content of the polysaccharide solution may be selected in order to achieve a desired viscosity. It will also be understood that the viscosity of the at least one polysaccharide or polysaccharide solution is the viscosity as measured before the at least one polysaccharide or polysaccharide solution is mixed with the binder composition and/or particulate refractory material to formulate the composition, i.e. the viscosity of the at least one polysaccharide or polysaccharide solution in isolation.

In some embodiments, the at least one hydrophilic polymer comprises at least 5, at least 10, at least 20, at least 30, at least 50, at least 60, at least 70, at least 80, or at least 90 wt % polysaccharide based on the total weight of hydrophilic polymer. In some embodiments, the binder composition comprises no more than 100, no more than 90, no more than 80, no more than 70, no more than 60, no more than 50, no more than 30, no more than 20, or no more than 10 wt % polysaccharide based on the total weight of hydrophilic polymer. In some embodiments, the binder composition comprises from 5 to 100, from 5 to 90, from 10 to 70, or from 20 to 70 wt % polysaccharide based on the total weight of hydrophilic polymer.

In some embodiments, the at least one hydrophilic polymer comprises polyacrylate as a synthetic polymer and dextrin as a polysaccharide derivative. In other embodiments, the at least one hydrophilic polymer comprises polyphosphate as a synthetic polymer and one or more of potato starch and carboxymethyl cellulose as polysaccharide and polysaccharide derivatives. In other embodiments, the at least one hydrophilic polymer comprises polyvinyl alcohol as a synthetic polymer and potato starch as a polysaccharide.

In some embodiments, the at least one hydrophilic polymer comprises from 30 to 80 wt % synthetic polymer and from 20 to 70 wt % polysaccharide based on the total weight of hydrophilic polymer. In some embodiments, the at least one hydrophilic polymer comprises from 50 to 80 wt % polyacrylate and from 20 to 50 wt % dextrin based on the total weight of hydrophilic polymer, wherein the polyacrylate may be an alkali polyacrylate salt. In some embodiments, the at least one hydrophilic polymer comprises from 30 to 70 wt % polyphosphate, from 15 to 40 wt % carboxymethyl cellulose and from 15 to 40 wt % potato starch based on the total weight of hydrophilic polymer, wherein the polyphosphate may be an alkali polyphosphate salt.

In some embodiments, the polysaccharide or polysaccharide derivative may comprise at least 0.5, at least 0.75, at least 1, at least 1.25, at least 1.5, at least 2, at least 2.5, at least 3, at least 4, or at least 5 wt % of the composition based on the weight of the refractory material.

Plasticisers

In some embodiments, the binder composition comprises at least one plasticiser. In some embodiments, the at least one plasticiser comprises one or more polyols or polyol derivatives. Polyols suitable for use as plasticisers in the present invention include glycerol, sorbitol, xylitol, maltitol, and mixtures thereof. Polyol derivatives suitable for use as plasticisers in the present invention include triglycerides, such as triacetin.

Providing at least one plasticiser in the binder composition may improve the strain-at-rupture values of the core by decreasing the glass transition temperature of the at least one hydrophilic polymer.

In some embodiments, the at least one plasticiser is in solution, for example an aqueous solution. In some embodiments, where the binder composition comprises more than one plasticiser, at least one of the plasticisers may be in solution, for example an aqueous solution. In some embodiments, where the binder composition comprises more than one plasticiser, all of the plasticisers may be in solution, for example an aqueous solution. In some embodiments, the plasticiser solution has a solids content of no more than 50%, no more than 40% or no more than 30% w/v. In some embodiments, the plasticiser solution has a solids content of at least 10%, at least 20%, at least 30% or at least 40% w/v.

In some embodiments, the binder composition comprises at least 0.01, at least 0.05, at least 0.1, at least 0.2, at least 0.5 or at least 1 wt % plasticiser or plasticiser solution based on the weight of binder composition. In some embodiments, the binder composition comprises no more than 2, no more than 1, no more than 0.5, no more than 0.2, no more than 0.1 or no more than 0.05 wt % plasticiser or plasticiser solution based on the weight of binder composition. In some embodiments, the binder composition comprises from 0.01 to 2, from 0.05 to 1, or from 0.1 to 1 wt % plasticiser or plasticiser solution based on the weight of binder composition.

In some embodiments, the binder composition comprises at least one plasticiser and the at least one hydrophilic polymer comprises at least one synthetic polymer. In some embodiments, the binder composition comprises at least one plasticiser and the at least one hydrophilic polymer comprises at least one polysaccharide or polysaccharide derivative. In some embodiments, the binder composition comprises at least one plasticiser and the at least one hydrophilic polymer comprises at least one synthetic polymer and at least one polysaccharide or polysaccharide derivative.

Polyols or polyol derivatives may be particularly suitable for use as plasticisers in compositions comprising polyvinyl alcohol as a synthetic polymer. In some embodiments, the at least one hydrophilic polymer comprises polyvinyl alcohol as a synthetic polymer and the binder composition comprises one or more of sorbitol and glycerol as plasticisers. In some such embodiments, the binder composition comprises from 50 to 90 wt % sorbitol and from 10 to 50 wt % glycerol based on the total weight of plasticiser. In some such embodiments, the at least one hydrophilic polymer further comprises potato starch as a polysaccharide.

Surfactants

In some embodiments, the composition comprises at least one surfactant. The at least one surfactant may be selected from group consisting of anionic, cationic, non-ionic and amphoteric surfactants, and mixtures thereof. Types of surfactant suitable for use in the present invention include sulphates, methosulphates, linear alcohol sulphates, sulphonates, sulphosuccinates, phosphate esters, glucosides, and mixtures thereof. In particular, the at least one surfactant may be selected from the group consisting of 2-ethylhexyl sulphosuccinate, 2-ethylhexyl sulphate, dodecylbenzene sulphonate, nonylphenol sulphate, sodium laureth sulphate, 3-ethylhexyl phosphate ester, undecyl amido propyl trimethyl ammonium methosulphate, alkyl polyglycol ether ammonium methosulphate, 2-ethylhexyl glucoside, hexyl glucoside, and mixtures thereof.

The inventors of the present invention have found that a binder composition with high surface tension can reduce the flowability of the composition, and that adding a small amount of surfactant can significantly increase the flowability of the composition by reducing the surface tension of the binder composition. In turn, the increased flowability of the composition results in a core having improved strength, for the reasons mentioned previously.

In some embodiments, the composition comprises at least 0.01, at least 0.02, at least 0.05, at least 0.1, at least 0.2, at least 0.5, or at least 1 wt % surfactant based on the weight of binder composition. In some embodiments, the composition comprises no more than 2, no more than 1, no more than 0.5, no more than 0.2, no more than 0.1, no more than 0.05 or no more than 0.02 wt % surfactant based on the weight of binder composition. In some embodiments, the composition comprises from 0.01 to 2, from 0.05 to 1, or from 0.1 to 1 wt % surfactant based on the weight of binder composition.

In some embodiments, the composition comprises from 0.1 to 1 wt % sulphosuccinate surfactant based on the weight of binder composition, wherein the sulphosuccinate surfactant may be 2-ethylhexyl sulphosuccinate.

Pozzolanic Additives

In the invention, the composition comprises at least one pozzolanic additive. The pozzolanic additive is typically a fine, powdered material. In some embodiments, the at least one pozzolanic additive comprises an alumina-, silica- or aluminosilicate-based powder, or mixtures thereof. The at least one pozzolanic additive may be selected from the group consisting of silica fume, fly ash, rice husk ash, diatomaceous earth, volcanic ash, metakaolin, and mixtures thereof. In some embodiments, the at least one pozzolanic additive comprises spherical particles and/or cenospheres (cenospheres being lightweight, hollow spheres).

In some embodiments, the at least one pozzolanic additive has a D50 particle diameter of no more than 20 µm, no more than 10 µm, no more than 5 µm, no more than 2 µm, no more than 1 µm, no more than 0.5 µm or no more than 0.1 µm. In some embodiments, the at least one pozzolanic additive has a D50 particle diameter of at least 0.01 µm, at least 0.05 µm, at least 0.1 µm, or at least 0.5 µm. In some embodiments, the at least one pozzolanic additive has a D50 particle diameter of from 0.01 µm to 50 µm, from 0.01 to 20 µm, from 0.01 to 10 µm, from 0.01 µm to 5 µm or from 0.01 µm to 2 µm.

The inventors of the present invention have found that addition of a pozzolanic additive significantly increases the strength of the core. The inventors also found that spherical pozzolanic particles and/or cenospheres significantly improve the flowability and compaction of the composition, and hence the strength of the core. Moreover, pozzolanic additives having a relatively small D50 diameter have been found to result in particularly good strength performance.

In some embodiments, the composition comprises at least 0.5, at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, or at least 30 wt % pozzolanic additive based on the weight of particulate refractory material. In some embodiments, the binder composition comprises no more than 20, no more than 10, no more than 5, no more than 2, or no more than 1 wt % pozzolanic additive based on the weight of particulate refractory material. In some embodiments, the composition comprises from 0.5 to 20, from 1 to or from 2 to 10 wt % pozzolanic additive based on the weight of particulate refractory material.

In some embodiments, the at least one pozzolanic additive comprises spherical silica fume particles having a D50 particle diameter of less than 2 µm. In some embodiments, the composition comprises from 1 to 10 wt % spherical silica fume particles based on the weight of refractory material, wherein the spherical silica fume particles may have a D50 particle diameter of less than 2 µm.

In some embodiments, the composition comprises both at least one pozzolanic additive and at least one surfactant.

Particulate Refractory Material

In some embodiments, the particulate refractory material comprises sand. The sand may be any type of sand suitable for use in refractory applications, such as quartz sand. In some embodiments, the particulate refractory material may comprise any one or more conventional refractory materials, such as oxides, carbides, nitrides etc of silicon, aluminium, magnesium, calcium and zirconium and other elements. Suitable refractory materials include but are not limited to quartz, olivine, chromite, zircon, and alumina. In some embodiments, the particulate refractory material comprises spherical particles and/or cenospheres, such as fly ash. In some embodiments, the particulate refractory material comprises a mixture of sand and spherical particles and/or cenospheres, such as a mixture of sand and fly ash.

In embodiments where the particulate refractory material and the pozzolanic additive both comprise spherical particles and/or cenospheres, the particulate refractory material and pozzolanic additive may both comprise the same type of spherical particles and/or cenospheres, e.g. fly ash. Alternatively, the particulate refractory material and pozzolanic additive may comprise different types of spherical particles and/or cenospheres, e.g. the particulate refractory material may comprise fly ash while the pozzolanic additive comprises silica fume. It will be understood that, in embodiments where the particulate refractory material and the pozzolanic additive both comprise the same type of spherical particles and/or cenospheres, the D50 particle size of the particulate refractory material will be larger than the D50 particle size of the pozzolanic additive, such that the particulate refractory material is distinct from the pozzolanic additive.

In some embodiments, the particulate refractory material has a D50 particle diameter of at least 20 µm, at least 50 µm, at least 100 µm, at least 250 µm, or at least 500 µm. In some embodiments, the particulate refractory material has a D50 particle diameter of no more than 2 mm, no more than 1 mm or no more than 500 In some embodiments, the particulate refractory material has a D50 particle diameter of from 20 µm to 2 mm, from 50 µm to 2 mm or from 50 µm to 1 mm.

Moulds

According to a fourth aspect of the invention, there is provided a mould for producing an article by high pressure die casting or semi-solid casting. The mould comprises a core for defining an internal cavity of the article and the core comprises a solidified core composition. The solidified core composition comprises a particulate refractory material and a binder composition. The solidified core composition degrades in water such that a cylinder of the solidified core composition having a maximum height of 80 mm and a maximum diameter of 50 mm disintegrates in no more than 10 minutes when immersed in water at a temperature of 20° C. and stirred at a speed of 60 rpm. The solidified core composition has a flexural strength of at least 300 N/cm².

A mould for high pressure die casting or semi-solid casting will typically be made from steel or another high melting point metal, and will typically be formed in two parts (referred to as dies) which are closed together in use to create a sealed casting cavity. A mould for high pressure die casting or semi-solid casting will usually include a system for injecting the molten metal into the casting cavity. The mould may also include a water cooling system within the walls of the die. High pressure die casting may be considered to be a die casting process in which the metal is injected and/or compressed at pressures from around 10 MPa to around 175 MPa.

The inventors of the present invention have found that a solidified core composition comprising a particulate refractory material and a binder composition which collapses in no more than 10 minutes when stirred in water and has a flexural strength of at least 300 N/cm² can be used to produce a core that has sufficient strength to withstand the forces of HPDC or semi-solid casting and can also be readily removed from a casting by flushing out with water. The mould of the fourth aspect of the invention therefore provides a more convenient and less expensive means for producing castings with internal cavities by HPDC and semi-solid casting.

In some embodiments, the solidified core composition disintegrates in no more than 5 minutes, no more than 2 minutes, no more than 1 minute, or no more than 30 seconds. Faster disintegration rates are preferred, where possible, to improve throughput during industrial casting production. In some embodiments, the disintegration time may be reduced by increasing the temperature of the water and/or by increasing agitation of the water. In practice, it will be understood that the level of agitation will be high, since the solidified core composition will be flushed out of the cast article using a jet of water The water used to flush out the solidified core composition in practice will typically be room temperature, but warm or hot water may be used (e.g. up to 70° C.). The claimed conditions of 20° C. and 60 rpm are therefore intended to represent the least favourable conditions that will be encountered in practice, under which water solubility will be expected to be at a minimum. It will be understood that if the solidified core composition disintegrates in less than 10 minutes under these conditions, the solidified core composition would be expected to be at least as water soluble under improved conditions (i.e. with higher temperature and agitation), if not more so.

In some embodiments, the cylinder of solidified core composition disintegrates in water even after being heated to a temperature of at least 200° C. In some embodiments, the cylinder of solidified core composition disintegrates in water after being heated to a temperature from 200 to 350° C.

In some embodiments, the solidified core composition has a flexural strength of at least 500 N/cm², at least 750 N/cm³ or at least 1000 N/cm². Higher flexural strengths are preferred, where possible, to reduce the chances of the core cracking during casting.

In some embodiments, the binder composition comprises at least one hydrophilic polymer.

In some embodiments, the at least one hydrophilic polymer comprises at least one synthetic polymer. The at least one synthetic polymer may be selected from the group consisting of polyacrylates, acrylate copolymers, polyphosphates, polymetaphosphates, polyvinyl alcohol and mixtures thereof. In some embodiments, the at least one hydrophilic polymer comprises at least one polysaccharide or polysaccharide derivative. The at least one polysaccharide or polysaccharide derivative may be selected from the group consisting of starches, starch derivatives, cellulose, cellulose derivatives, and mixtures thereof.

In some embodiments, the at least one hydrophilic polymer does not undergo cross-linking when the composition is heated at temperatures up to 250° C., up to 300° C. or up to 350° C. In some embodiments, the at least one hydrophilic polymer does not undergo cross-linking when the composition is heated to a temperature from 200 to 350° C.

In some embodiments, the solidified core composition comprises at least one pozzolanic additive. In some embodiments, the at least one pozzolanic additive comprises an alumina-, silica- or aluminosilicate-based powder, or mixtures thereof. The at least one pozzolanic additive may be selected from the group consisting of silica fume, fly ash, rice husk ash, diatomaceous earth, volcanic ash, metakaolin, and mixtures thereof. In some embodiments, the at least one pozzolanic additive comprises spherical particles and/or cenospheres.

In some embodiments, the particulate refractory material comprises quartz sand. In some embodiments, the particulate refractory material comprises spherical particles and/or cenospheres. In some embodiments, the particulate refractory material comprises fly ash. In some embodiments, the particulate refractory material has a D50 particle diameter of at least 50 μm.

The solidified core composition may comprise a composition according to the first aspect. It will be understood that any of the embodiments discussed in relation to the first aspect may be freely combined and applied to the solidified core composition of the fourth aspect.

In some embodiments, the core is coated with a surface coating. The surface coating may be any coating suitable for refractory applications, for example coatings comprising boron nitride, silicates, titania, zirconia and/or alumina.

Methods

According to a fifth aspect of the invention, there is provided a method for producing an article by high pressure die casting or semi-solid casting. The method comprises the steps of:
(i) mixing composition as described herein to form a mixture;
(ii) moulding and hardening the mixture to produce a core in the shape of an internal cavity of the article;
(iii) assembling the core with a mould for high pressure die casting or semi-solid casting, such that the mould and the core together define a casting cavity;
(iv) injecting molten or semi-molten metal into the casting cavity until the cavity is filled;
(v) cooling and solidifying the molten or semi-molten metal to form the article, the core being contained within the internal cavity of the article;
(vi) removing the article containing the core from the mould; and
(vii) removing the core from the internal cavity by flushing out with water.

It will be understood that, in the step of mixing a particulate refractory material and a binder composition to form a mixture, the binder composition may be provided as a pre-formed mixture, a partially pre-formed mixture, or as individual components which combine together to provide the binder composition when mixed with the particulate refractory material. In some embodiments, the binder composition may be partially pre-formed and subsequently mixed with supplementary components to form the binder composition. In some embodiments, the binder composition may be partially pre-formed and thus be provided as a first mixture containing all the liquid components. The first mixture may then be supplemented with one or more dry components to form the binder composition. The partially pre-formed binder composition may comprise the polysaccharide or polysaccharide derivative, and optionally, one or more of: a further hydrophilic polymer, a synthetic polymer, and a surfactant. In some embodiments, the binder composition may be pre-mixed with the pozzolanic additive, prior to mixing with the particulate refractory material.

In some embodiments, the binder composition comprises at least one hydrophilic polymer.

In some embodiments, the at least one hydrophilic polymer comprises at least one synthetic polymer. In some embodiments, the at least one hydrophilic polymer comprises at least one polysaccharide or polysaccharide derivative. In some embodiments, the at least one hydrophilic polymer is in solution. In some embodiments, the binder composition comprises at least one surfactant. It will be understood that synthetic polymers, polysaccharides and surfactants suitable for use with the fifth aspect, and quantities and characteristics thereof, are the same as those described in relation to the first aspect.

In some embodiments, the at least one hydrophilic polymer does not undergo cross-linking during any step of the method.

In some embodiments, the particulate refractory material comprises quartz sand. In some embodiments, the particulate refractory material comprises spherical particles and/or cenospheres. In some embodiments, the particulate refractory material comprises fly ash. In some embodiments, the particulate refractory material has a D50 particle diameter of at least 50 μm.

In some embodiments, the binder composition comprises at least one surfactant.

In some embodiments, the step of mixing a particulate refractory material and a binder composition to form a mixture includes mixing at least one pozzolanic additive with the particulate refractory material and binder composition to form the mixture. It will be understood that pozzolanic additives suitable for use with the fifth aspect, and quantities and characteristics thereof, are the same as those described in relation to the first aspect.

In some embodiments, the mixture is a composition in accordance with the first aspect. It will be understood that any of the embodiments discussed in relation to the first aspect may be freely combined and applied to the mixture of the fifth aspect.

In some embodiments, the step of moulding and hardening the mixture includes compacting the mixture into a core mould. In some embodiments, the step of moulding and hardening the mixture includes drying the mixture. In some embodiments, the step of moulding and hardening the mixture is performed using a core-shooting apparatus. In some embodiments, the step of moulding and hardening the mixture to produce a core includes producing the core by an additive manufacturing or 3D printing process.

In some embodiments, the method further comprises a step of coating the core with a surface coating prior to assembling the core with a mould. The surface coating may be the same as described in relation to the second and fourth aspects of the invention.

DETAILED DESCRIPTION

Figure 1A:
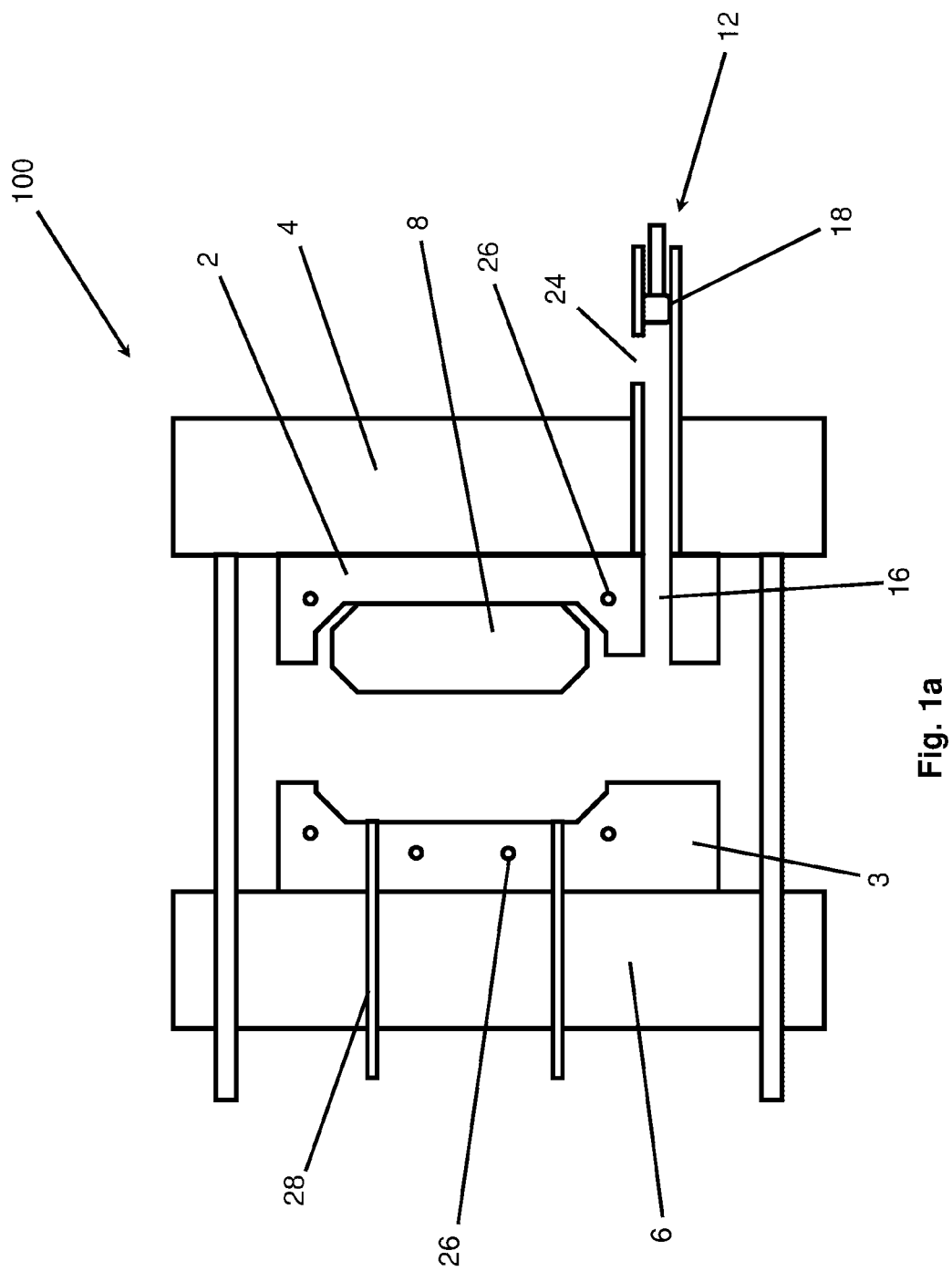
FIG. 1a is a schematic view of a high pressure die casting mould in accordance with an embodiment of the present invention, in an open position.
Figure 1B:
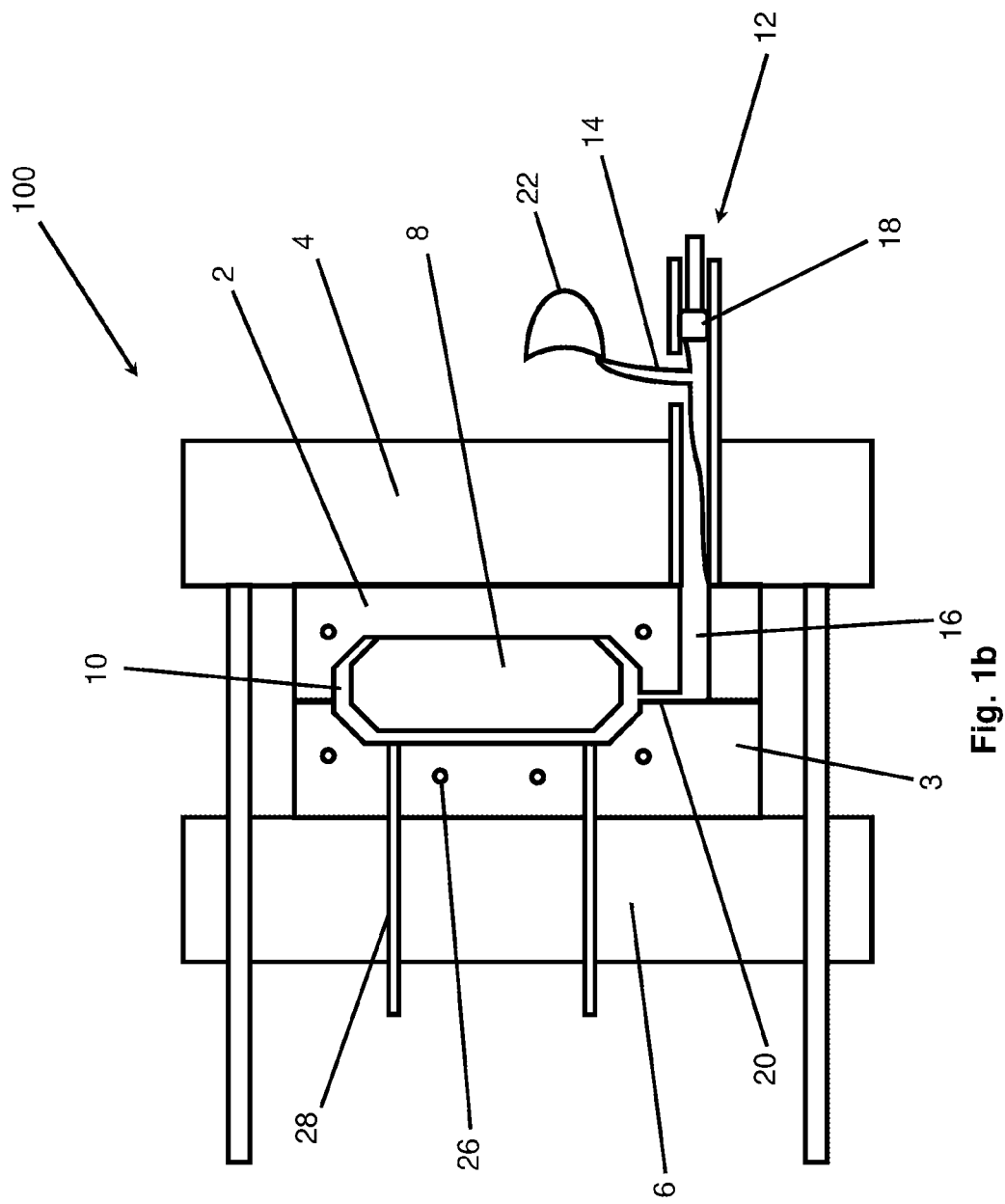
FIG. 1b is a schematic view of the high pressure die casting mould shown in FIG. 1a, in a closed position.

FIG. 1a shows an example of a high pressure die casting mould 100 according to an embodiment of the present invention, in an open position. The mould 100 comprises a first die 2 mounted on a fixed plate 4 and a second die 3 mounted on a movable plate 6. A core 8 in accordance with the present invention is assembled on the first die 2. In use, the movable plate 6 is moved towards the fixed plate 4, bringing the dies 2, 3 together into a closed position (shown in FIG. 1*b*). A casting cavity 10 is defined between the dies 2, 3 and the core 8.

The mould 100 also comprises an injection system 12 for injecting molten metal 14 into the casting cavity 10. The injection system 12 comprises a chamber 16 for holding the molten metal 14 and a piston 18 for pushing the molten metal 14 through the chamber 16 and into the casting cavity 10, via a gate 20 defined between the first and second dies 2, 3. Molten metal may be supplied to the injection system by any appropriate means, e.g. by immersing in a basin or crucible of molten metal. In the embodiment illustrated in FIGS. 1*a* and 1*b*, molten metal 14 is supplied to the injection system 12 by pouring molten metal 14 from a ladle or pouring cup 22 into the chamber 16, via an opening 24 in the chamber 16.

The injection system 12 fills the casting cavity 10 extremely quickly, within seconds or even milliseconds, and continues to apply pressure to the metal until the metal has solidified. The metal may be rapidly cooled by a water cooling system, which comprises a series or network of water cooling pipes 26 extending through the dies 2, 3, in order to accelerate solidification of the metal. Once the metal has solidified, the movable plate 6 is retracted, separating the dies 2, 3 and opening the mould 100. The solidified casting may then be ejected from the mould by ejector pins 28, which push the casting out of the die 3.

At this stage, the core 8 will still be contained within the casting. In accordance with the present invention, the core 8 is made from a composition which disintegrates in water and can be readily removed from the casting by simply flushing out with water.

EXAMPLES

Example 1

The following example compositions were initially prepared:

TABLE 1

| Composition | 1 | 2 | 3 | 4 | 5 |
|---|---|---|---|---|---|
| Sand | Quartz | Quartz | Quartz | Quartz | Quartz |
| Binder composition | | | | | |
| Water [a] | 29.6 | 50.9 | 43.6 | 43.5 | |
| Sucrose [a] | 62.7 | | | | |
| Sodium 4-(methoxycarbonyl) phenolate [a] | 0.1 | | | | |
| Sodium polyphosphate [a,c] (Budit 4H) | | 21.8 | 29.1 | 29.1 | |

TABLE 1-continued

| Composition | 1 | 2 | 3 | 4 | 5 |
|---|---|---|---|---|---|
| Sodium polyacrylate [a,d] (Dispex AA4135) | | | | | 69.65 |
| Dextrin [a,d] (P623/4) | | | | | 29.85 |
| Carboxymethyl cellulose [a] | 7.6 | 13.65 | 13.65 | 13.65 | |
| Potato Starch [a] (Honig) | | 13.65 | 13.65 | 13.65 | |
| Dodecylbenzene sulphonate [a] (Sermul EA88) | | | | 0.1 | |
| 2-Ethylhexyl sulphosuccinate [a] (Serwet WH175) | | | | | 0.50 |
| Total [b] | 3.03 | 11.00 | 11.00 | 11.00 | 5.00 |
| Pozzolanic additive | | | | | |
| Fly ash [b] (Microsit H10) | | | | | 2.00 |

[a] wt % relative to total weight of binder composition,
[b] wt % relative to weight of sand,
[c] polymer chain length 30,
[d] aqueous solution, 40% w/v solids content A Laempe L1 laboratory-type core-shooting apparatus was used to produce hardened cores from each of example compositions 1-5. The core-shooting apparatus was set with a shooting time of 1-2 seconds and shooting pressure of 4 bar. If needed, the cores were purged with heated air at 120° C. for 60-300 seconds. The core box temperature was set at 140° C. The cores were produced in a generally cylindrical shape having a maximum diameter of 50 mm and a total height of 80 mm, with a 30 mm frustonical portion at one end tapering to a minimum diameter of 40 mm. The example compositions were also used to make transverse bars having dimensions of 180×22.4×22.4 mm, for bending strength measurements.

The cylindrical cores and transverse bars made using example compositions 1-5 were tested for bending strength and water solubility both immediately after production (as received) and after heating for 2 hours at 120, 140, 160, 180, 200, 220 or 240° C., to simulate a range of temperatures that the core might be exposed to in use.

The bending strength of the transverse bars was measured with a three-point bending test at room temperature.

The water solubility of the cores was determined qualitatively by suspending a core inside a box, filling the box with water at room temperature until the core was fully immersed in the water, then draining the water from the box and observing how much of the suspended core material had disintegrated.

Example compositions 3-5 were also tested for flowability using a Brookfield Powder Flow Tester. The unconfined failure strength of the composition was measured at 0.60, 1.13, 2.19, 4.35 and 8.70 kPa.

The results are shown in Table 2:

TABLE 2

| Composition | 1 | 2 | 3 | 4 | 5 |
|---|---|---|---|---|---|
| Bending strength | | N/cm$^2$ | | | |
| As received | 120-140 | 270 | 304 | 269 | 372 |
| 120° C. | 60 | 225 | 183 | 225 | 278 |
| 140° C. | 20 | 215 | 143 | 177 | 297 |

TABLE 2-continued

| Composition | 1 | 2 | 3 | 4 | 5 |
|---|---|---|---|---|---|
| 160° C. | 10 | 200 | 149 | 204 | 228 |
| 180° C. | 100 | 175 | 136 | 208 | 261 |
| 200° C. | 120 | 230 | 124 | 192 | 286 |
| 220° C. | n/a | n/a | 119 | 196 | 238 |
| 240° C. | n/a | n/a | 95 | 182 | 260 |
| Water solubility | | | | | |
| As received | excellent | excellent | excellent | excellent | excellent |
| 120° C. | excellent | excellent | excellent | excellent | excellent |
| 140° C. | excellent | excellent | excellent | excellent | excellent |
| 160° C. | good | excellent | excellent | excellent | excellent |
| 180 °C | bad | excellent | excellent | excellent | excellent |
| 200° C. | bad | excellent | excellent | excellent | excellent |
| 220° C. | bad | excellent | excellent | excellent | excellent |
| 240° C. | bad | excellent | excellent | excellent | excellent |
| Flowability | | | | | |
| 0.60 kPa | n/a | n/a | 0.613 | 0.485 | 0.304 |
| 1.13 kPa | n/a | n/a | 0.976 | 0.691 | 0.413 |
| 2.19 kPa | n/a | n/a | 1.574 | 1.047 | 0.535 |
| 4.35 kPa | n/a | n/a | 2.335 | 1.47 | 0.671 |
| 8.70 kPa | n/a | n/a | 3.392 | 2.2 | 0.9075 |
| Environmentally friendly | yes | no | no | no | yes |

Example composition 1, comprising sucrose and carboxymethyl cellulose as hydrophilic polymers, achieved good water solubility up to 160° C. However, the sucrose caramelised above 160° C., drastically reducing the water solubility, and the cores were relatively weak, with flexural bending strengths significantly lower than 200 N/cm².

Cores made using the polyphosphate-based compositions, example compositions 2-4, achieved excellent water solubility even after heating at temperatures up to 240° C. for 2 hours, and good flexural strength. Example composition 4, which comprised a small amount of surfactant but was otherwise identical to example composition 3, showed improved flexural strength after heat treatment, as well as improved flowability.

Example composition 5, comprising sodium polyacrylate and dextrin as hydrophilic polymers together with a small amount of surfactant, achieved good flexural strength, water solubility and flowability—even after heating at up to 240° C. for 2 hours—as well as being environmentally friendly. This composition was therefore selected as a basis for further tests.

Example 2

Further compositions were prepared based on example composition 5, comprising the same components and in the same quantities, but with varying proportions of sodium polyacrylate and dextrin.

Cores made using these compositions were tested for bending strength and flowability using the same procedures as described in Example 1.

Water solubility was measured semi-quantitatively using a similar procedure to the procedure described in Example 1. A core was suspended inside a box and the box was filled with water at room temperature until the core was fully immersed. The core was then gently shaken and the time taken for the core to completely disintegrate was observed.

The results are shown in Tables 3a and 3b:

TABLE 3a

| Composition | 6 | 7 | 8 | 9 | 10 |
|---|---|---|---|---|---|
| Sodium polyacrylate [a, b] | 0 | 10 | 20 | 30 | 40 |
| Dextrin [a, b] | 100 | 90 | 80 | 70 | 60 |
| Bending strength | | | N/cm² | | |
| As received | 228 ± 19 | 235 ± 12 | 268 ± 9 | 310 ± 7 | 295 ± 6 |
| Water solubility | | | seconds | | |
| As received | 5-10 | 5-10 | 5-10 | 5-10 | 5-10 |
| 140° C. | 20-30 | 15-25 | 10-15 | 10-15 | 15-25 |
| 200° C. | 150-180 | n/a | n/a | n/a | n/a |
| Flowability | | | | | |
| 0.60 kPa | 0.450 | 0.429 | 0.388 | 0.411 | 0.384 |
| 1.13 kPa | 0.627 | 0.600 | 0.579 | 0.570 | 0.564 |
| 2.19 kPa | 0.841 | 0.800 | 0.803 | 0.748 | 0.732 |

TABLE 3a-continued

| Composition | 6 | 7 | 8 | 9 | 10 |
|---|---|---|---|---|---|
| 4.35 kPa | 1.112 | 1.021 | 1.021 | 0.959 | 0.923 |
| 8.70 kPa | 1.371 | 1.359 | 1.334 | 1.142 | 1.136 |

[a] wt % relative to total weight of sodium polyacrylate and dextrin,
[b] aqueous solution, 40% w/v solids content TABLE 3b

| Composition | 11 | 12 | 13 | 14 | 15 | 16 |
|---|---|---|---|---|---|---|
| Sodium polyacrylate [a, b] | 50 | 60 | 70 | 80 | 90 | 100 |
| Dextrin [a, b] | 50 | 40 | 30 | 20 | 10 | 0 |
| Bending strength | | | N/cm$^2$ | | | |
| As received | 316 ± 9 | 391 ± 26 | 410 ± 19 | 374 ± 38 | 313 ± 9 | 264 ± 40 |
| Water solubility | | | seconds | | | |
| As received | 5-10 | 10-15 | 10-15 | 20-25 | 10-15 | 20-30 |
| 140° C. | 5-10 | 5-10 | 20-30 | 20-30 | 20-25 | 20-25 |
| 200° C. | n/a | 50-60 | 15-25 | 30-40 | 30-40 | 30-40 |
| Flowability | | | | | | |
| 0.60 kPa | 0.403 | 0.42 | 0.413 | 0.423 | 0.402 | 0.395 |
| 1.13 kPa | 0.567 | 0.561 | 0.556 | 0.574 | 0.555 | 0.558 |
| 2.19 kPa | 0.729 | 0.708 | 0.717 | 0.722 | 0.713 | 0.721 |
| 4.35 kPa | 0.9 | 0.861 | 0.871 | 0.874 | 0.886 | 0.889 |
| 8.70 kPa | 1.089 | 1.033 | 1.053 | 1.055 | 1.061 | 1.076 |

[a] wt % relative to total weight of sodium polyacrylate and dextrin,
[b] aqueous solution, 40% w/v solids content Each of the cores made with example compositions 6-16 showed reasonable flexural strength of at least 200 N/cm$^2$. The cores comprising 30-100 wt % sodium polyacrylate showed good flexural strength of around ≥300 N/cm$^2$, while the cores comprising 60-80 wt % sodium polyacrylate in particular showed very good flexural strength of around ≥400 N/cm$^2$.

Each of the cores showed very good water solubility as received. However, after heating for 2 hours at 200° C. the cores comprising 10-50 wt % sodium polyacrylate only weakened in water and did not disintegrate, so these compositions would only be suitable for lower temperature applications. The cores comprising 60-100 wt % sodium polyacrylate showed good water solubility even after heating for 2 hours at 200° C., with the core comprising 70 wt % sodium polyacrylate showing particularly good water solubility.

Each of the compositions showed acceptable flowability, with the compositions comprising 50-100 wt % sodium polyacrylate showing particular good flowability.

The composition comprising 70 wt % sodium polyacrylate (corresponding to example compositions 5 and 13) was selected as a basis for further testing against several other binder combinations.

Example 3

Cores were prepared using the following compositions and tested for flexural strength and water solubility on the cores as received (without exposure to heat). Flexural strength was tested using the same methodology described in Example 1.

Water solubility was measured quantitatively. A large beaker was placed on a set of scales and the scales were tared. The core was mounted onto the end of a rotor shaft and lowered into the beaker such that the core was suspended above the base of beaker and did not weigh on the scales. The container was then filled with water to fully immerse the core, and the core was rotated on the rotor shaft to stir the water. The weight displayed on the scales was observed to determine the time taken for the core to completely disintegrate and fall into the container. This experiment was performed under two different conditions: 1) stirring rotation speed 60 rpm and water temperature 20° C.; and 2) stirring rotation speed 150 rpm and water temperature 65° C.

The results are shown in Table 4:

TABLE 4

| Composition | 17 | 18 | 19 | 20 | 21 |
|---|---|---|---|---|---|
| Sand | Quartz | Quartz | Quartz | Quartz | Quartz |
| Binder composition | | | | | |
| Water [a] | | 4.5 | | | |
| Sodium polyacrylate [a,d] (Dispex AA4135) | 69.65 | | | | |
| Dextrin [a,d] (P623/4) | 29.85 | | | | |
| Sodium silicate/lithium silicate [a,f] (ZSE 874) | | 90.0 | | | |
| Potassium silicate [a,f] (K-silicate 42/43) | | 5.0 | | | |
| Phenol formaldehyde [a] (Politec E 6010) | | | 50.0 | | |
| Isocyanic acid, polymethylene polyphenylene ester [a] (Politec E 9030) | | | 50.0 | | |
| Acid catalyst [a] (Cataset ST2) | | | | 23.1 | |
| Furfuryl alcohol [a] (Eshanol U1N) | | | | 76.9 | |
| Polyvinyl alcohol [a,e] (P118/2) | | | | | 74.1 |
| Glycerol [a] (Glysorb 14) | | | | | 1.5 |

TABLE 4-continued

| Composition | 17 | 18 | 19 | 20 | 21 |
|---|---|---|---|---|---|
| Sorbitol [a,d] (Glysorb 14) | | | | | 5.9 |
| Potato Starch [a] | | | | | 18.5 |
| 2-Ethylhexyl sodium sulfate [a] (DSK 40) | | 0.5 | | | |
| 2-Ethylhexyl sulphosuccinate [a] (Serwet WH175) | 0.50 | | | | |
| Total [b] | 10.0 | 4.0 | 1.6 | 2.16 | 10.8 |
| Pozzolanic additive | | | | | |
| Silica fume [c] (Cofermin silica fume A) | 100.0 | 68.0 | | | 100.0 |
| Aluminium silicate [c] (Eurocell 150H) | | 6.8 | | | |
| Carbon black [c] | | 0.2 | | | |
| Silica/kaolinite [c] (Aktisil EM) | | 25.0 | | | |
| Total [b] | 8.0 | 0.8 | 0.0 | 0.0 | 8.0 |
| Bending strength | | | N/cm² | | |
| As received | 829 ± 27 | 794 ± 18 | 335 ± 9 | 287 ± 1 | 798 ± 8 |
| Water solubility | | | seconds | | |
| 20° C., 60 rpm | 20-40 | n/a (>60 min) | n/a (>60 min) | n/a (>60 min) | 240-260 |
| 65° C., 150 rpm | 5-15 | n/a (>60 min) | n/a (>60 min) | n/a (>60 min) | 15-45 |

[a] wt % relative to total weight of binder composition,
[b] wt % relative to weight of sand,
[c] wt % relative to total weight of pozzolanic additive,
[d] aqueous solution, 40% w/v solids content,
[e] aqueous solution, 20% w/v solids content,
[f] aqueous solution, 35-45% w/v solids content Cores made using compositions 17, 18 and 21 showed excellent flexural strength of around 800 N/cm².

Cores made using compositions 18-20 did not show any water solubility even when stirred at 65° C. and 150 rpm, so these compositions were deemed not suitable for use in the present invention. Composition 21 showed acceptable water solubility, while composition 17 showed excellent water solubility.

Composition 17 was based on compositions 5 and 13, with silica fume used instead of fly ash and an increased amount of binder composition and pozzolanic additive used. These changes resulted in a doubling of the flexural strength compared with compositions 5 and 13, without any significant loss of water solubility or flowability. Cores made using composition 17 were free from defects and showed excellent, homogenous compaction.

The water solubility of compositions 17 and 21 was further tested after heating the cores for 30 minutes at 200, 300 and 400° C., with a water temperature of 65° C. and rotation speed of 150 rpm. The results are shown in Table 5:

TABLE 5

| Composition | As received | 200° C. | 300° C. | 400° C. |
|---|---|---|---|---|
| 17 | 5-15 s | 5-15 s | 5-15 s | 20-120 s |
| 21 | 15-45 s | 30-240 s | n/a (>300 s) | n/a (>300 s) |

Cores made using composition 17 showed good water solubility even after heating up to 400° C. Cores made using composition 21 showed good water solubility after heating up to 200° C., but cores heated up to 300 and 400° C. did not show signs of significant disintegration after 300 s of stirring in water.

Example 4

The effect of varying the relative binder and pozzolanic additive content on the strength of the cores was investigated. Cores were prepared using the following compositions and tested for flexural strength and water solubility on the cores as received (without exposure to heat). Flexural strength was tested using the same methodology described in Example 1.

The binder used in each of the compositions below was as described in Composition 17 above: 69.65% sodium polyacrylate (Dispex AA4135); 29.85% dextrin (P623/4); and 0.5% 2-ethylhexyl sulphosuccinate (Serwet WH175). Percentages are wt % relative to total weight of binder composition. The results are shown in Tables 6a and 6b (Composition 26 has been listed twice for ease of comparison).

Table 6a shows the effect of varying the pozzolanic content. It has been found that increasing the pozzolanic additive content lead to cores with greater bending strength. Composition 23, containing no pozzolanic additive, was significantly weaker than even a 2% pozzolanic additive relative to the weight of sand. Compositions 22 and 26 show that specific pozzolanic additive choice effects the bending strength, but that desirable strength is not limited to a sole pozzolanic additive.

TABLE 6a

| Composition | 22 | 23 | 24 | 25 | 26 |
|---|---|---|---|---|---|
| Refractory material | | | Quartz sand (H33) | | |
| Binder content [a] | 6 | 6 | 6 | 6 | 6 |
| Pozzolanic additive | Fly ash | — | Silica Fume A | Silica Fume A | Silica Fume A |
| Pozzolanic content [a] | 6 | 0 | 2 | 4 | 6 |
| Bending Strength | | | N/cm² | | |
| As received | 547 ± 22 | 110 ± 7 | 694 ± 20 | 1040 ± 41 | 1332 ± 29 |

[a] wt % relative to weight of refractory material

TABLE 6b

| Composition | 27 | 28 | 29 | 30 | 26 |
|---|---|---|---|---|---|
| Refractory material | | | Quartz sand (H33) | | |
| Binder content [a] | 2 | 3 | 4 | 5 | 6 |
| Pozzolanic content [a,b] | 6 | 6 | 6 | 6 | 6 |
| Bending Strength | | | N/cm² | | |
| As received | 71 ± 4 | 435 ± 15 | 809 ± 22 | 1056 ± 37 | 1332 ± 29 |

[a] wt % relative to weight of refractory material;
[b] Silica Fume A

Table 6b shows that increasing the binder content (e.g. the hydrophilic polymer content), relative to the weight of refractory material, lead to an increase in bending strength of the cores. Compositions having very low binder content were found to be significantly weaker, despite a relatively high content of pozzolanic additive. All of the compositions 22 to 30 were found to have acceptable water solubility.

The invention claimed is:

1. A composition for making a core for use in a molding or metal casting process, the composition comprising:
   a particulate refractory material;
   a binder composition comprising 10 to 80 wt. % of at least one hydrophilic polymer, wherein the at least one hydrophilic polymer comprises at least one polysaccharide or polysaccharide derivative; and wherein the at least one hydrophilic polymer comprises at least one synthetic polymer having a molecular weight of no more the 1,000,000 g/mol and/or selected from the group consisting of polyacrylates, polymethacrylates, polyphosphates, polymetaphosphates, polyvinyl alcohol, alkali polyacrylate salts, alkali polyphosphate salts, and mixtures thereof, wherein the binder composition has a dynamic viscosity at 23° C. from 5 mPa·s to 1 Pa·s; and
   2 to 10 wt. % based on the weight of the particulate refractory material of at least one pozzolanic additive, wherein the pozzolanic additive has a D50 particle diameter of 0.01 to 20 µm.

2. The composition of claim 1, wherein the composition comprises from 2 to 10 wt. % of the binder composition, relative to the weight of the refractory material.

3. The composition of claim 1, wherein the at least one polysaccharide or polysaccharide derivative is selected from the group consisting of: starches, starch derivatives, potato starch, dextrin cellulose, cellulose derivatives, carboxymethyl cellulose, and mixtures thereof.

4. The composition of claim 1, wherein the at least one hydrophilic polymer does not undergo cross-linking when the composition is heated to a temperature from 200 to 350° C.

5. The composition of claim 1, wherein the binder composition further comprises at least one plasticizer comprising at least one polyol or polyol derivative.

6. The composition of claim 1, further comprising at least one surfactant selected from the group consisting of: anionic, cationic, non-ionic and amphoteric surfactants, sulphates, methosulphates, linear alcohol sulphates, sulphonates, sulphosuccinates, phosphate esters, glucosides, 2-ethylhexyl sulphosuccinate, 2-ethylhexyl sulphate, dodecylbenzene sulphonate, nonylphenol sulphate, sodium laureth sulphate, 3-ethylhexyl phosphate ester, undecyl amido propyl trimethyl ammonium methosulphate, alkyl polyglycol ether ammonium methosulphate, 2-ethylhexyl glucoside, hexyl glucoside, and mixtures thereof.

7. The composition of claim 1, wherein the at least one pozzolanic additive comprises spherical particles and/or cenospheres, and/or is selected from the group consisting of silica fume, fly ash, rice husk ash, diatomaceous earth, volcanic ash, metakaolin, and mixtures thereof.

8. The composition of claim 1, wherein the particulate refractory material has a D50 particle diameter of at least 50 µm and/or comprises one or more of: sand; quartz sand; spherical particles and/or cenospheres; and fly ash.

9. A core comprising the composition of claim 1.

10. The core of claim 9, wherein the core is coated with a surface coating comprising boron nitride, silicate, titania, alumina, zirconia, or mixtures thereof.

11. A mold comprising the core claim 9, wherein the mold is for producing an article by metal casting and the core is for defining an internal cavity of the article, wherein the mold is for high pressure die casting or semi-solid casting.

12. The mold according to claim 11, wherein the solidified core composition degrades in water such that a cylinder of the solidified core composition having a maximum height of 80 mm and a maximum diameter of 50 mm disintegrates in less than 10 minutes when immersed in water at a temperature of 20° C. and stirred at a speed of 60 rpm, and
   wherein the solidified core composition has a flexural strength of at least 300 N/cm$^2$.

13. The mold of claim 12, wherein the cylinder of solidified core composition disintegrates in water in less than 10 minutes after being heated to a temperature from 200 to 350° C.

14. A method for producing an article by high pressure die casting or semi-solid casting, the method comprising the steps of:
   (i) mixing a composition according to claim 1 to form a mixture;
   (ii) molding and hardening the mixture to produce a core in the shape of an internal cavity of the article;
   (iii) assembling the core with a mold for high pressure die casting or semi-solid casting, such that the mold and the core together define a casting cavity;
   (iv) injecting molten or semi-solid metal into the casting cavity until the cavity is filled;
   (v) cooling and solidifying the molten or semi-molten metal to form the article, the core being contained within the internal cavity of the article;
   (vi) removing the article containing the core from the mold; and
   (vii) removing the core from the internal cavity by flushing out with water.

15. The method of claim 14, further comprising a step of coating the core with a surface coating prior to assembling the core with the mold.

16. The method of claim 14, wherein the step of molding and hardening the mixture includes drying the mixture; and/or includes compacting the mixture into a core mold; and/or is performed using a core-shooting apparatus; and/or includes producing the core by an additive manufacturing or 3D printing process.

* * * * *